(12) United States Patent
Nomura

(10) Patent No.: US 8,771,852 B2
(45) Date of Patent: Jul. 8, 2014

(54) BATTERY PACK WITH CONTACTLESS POWER TRANSFER

(75) Inventor: Masato Nomura, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/398,901

(22) Filed: Feb. 17, 2012

(65) Prior Publication Data

US 2012/0148878 A1   Jun. 14, 2012

Related U.S. Application Data

(63) Continuation of application No. PCT/JP2010/063254, filed on Aug. 5, 2010.

(30) Foreign Application Priority Data

Aug. 25, 2009  (JP) ................................. 2009-194634

(51) Int. Cl.
*H01M 14/00* (2006.01)
*H01M 2/00* (2006.01)

(52) U.S. Cl.
USPC ............................................. 429/7; 429/10

(58) Field of Classification Search
USPC ................ 429/10, 7, 163, 175, 176, 177, 121
See application file for complete search history.

(56) References Cited

U.S. PATENT DOCUMENTS

| | | | |
|---|---|---|---|
| 8,072,304 B2 | 12/2011 | Kato et al. | |
| 2008/0164840 A1 | 7/2008 | Kato et al. | |
| 2009/0015362 A1 | 1/2009 | Okada et al. | |

FOREIGN PATENT DOCUMENTS

| | | | | |
|---|---|---|---|---|
| CN | 101304183 A | 11/2008 | | |
| CN | 101304184 A | 11/2008 | | |
| CN | 101345327 A | 1/2009 | | |
| JP | 58-21968 | 2/1983 | | |
| JP | 07-265442 | * 10/1995 | ............. | A61N 1/378 |
| JP | 9-190938 A | 7/1997 | | |
| JP | 2003-086440 A | 3/2003 | | |
| JP | 2005-130211 A | 5/2005 | | |
| JP | 2007-165141 A | 6/2007 | | |
| JP | 2008-048482 A | 2/2008 | | |
| JP | 2008-066140 A | 3/2008 | | |
| JP | 2008-294385 A | 12/2008 | | |

OTHER PUBLICATIONS

PCT/JP2010/063254 Written Opinion dated Oct. 19, 2010.
First Office Action with English Translation of cover page, issued Jan. 3, 2014.

* cited by examiner

*Primary Examiner* — Raymond Alejandro
(74) *Attorney, Agent, or Firm* — Dickstein Shapiro LLP

(57) ABSTRACT

A battery pack that includes a secondary battery, a resin structure including the secondary battery, and a flat-shaped, contactless power transfer coil embedded at a first face side of the resin structure. The resin structure contains a magnetic material at least at the first face side thereof.

15 Claims, 6 Drawing Sheets

BATTERY PACK WITH CONTACTLESS POWER TRANSFER

CROSS REFERENCE TO RELATED APPLICATIONS

The present application is a continuation of International application No. PCT/JP2010/063254, filed Aug. 5, 2010, which claims priority to Japanese Patent Application No. 2009-194634, filed Aug. 25, 2009, the entire contents of each of which are incorporated herein by reference.

FIELD OF THE INVENTION

The present invention relates to battery packs. More particularly, the present invention relates to a battery pack including a flat-shaped coil for contactless power transfer.

BACKGROUND OF THE INVENTION

There are cases in which provision of a water proof function is required in portable electronic devices (for example, mobile phones). In order to give the waterproof function to the electronic devices, it is desirable to prevent exposure of charging terminals and it is necessary to adopt a method of transferring power in a contactless manner for charge without the provision of the charging terminals. Battery packs including dielectric coils have been developed in recent years in order to transfer power in a contactless manner for charge. PTL 1 discloses a battery pack including a secondary battery and a flat-shaped coil. In the battery pack in PTL 1, the flat-shaped coil is deposited on one face (a first flat face), among two opposing faces of the secondary battery having a width larger than its thickness, via a sheeted electromagnetic shielding film.

PTL 2 discloses a battery pack including a secondary battery and a flat-shaped coil. In the battery pack in PTL 2, the flat-shaped coil sandwiched between a radio wave absorbing layer and a laminating layer is deposited on one face (a flat face), among two opposing faces of the secondary battery having a width larger than its thickness.

PTL 1: Japanese Unexamined Patent Application Publication No. 2008-66140
PTL 2: Japanese Unexamined Patent Application Publication No. 2008-48482

SUMMARY OF THE INVENTION

However, the flat-shaped coil is only deposited on the first flat face via the sheeted electromagnetic shielding film in the battery pack disclosed in PTL 1, it is possible to inhibit leakage of a magnetic flux from the face of the flat-shaped coil being in contact with the electromagnetic shielding film but it is not possible to inhibit the leakage of the magnetic flux from faces of the flat-shaped coil perpendicular to the electromagnetic shielding film. Accordingly, there is a problem in that an eddy current occurs on a casing of the secondary battery due to the leaking magnetic flux to possibly cause adverse effects, such as heat emission from the main body of the secondary battery. In addition, since the sheeted electromagnetic shielding film is arranged between the secondary battery and the flat-shaped coil, the magnetic flux leaks if the sheeted electromagnetic shielding film is shifted. Accordingly, there is a problem in that the eddy current occurs on the casing of the secondary battery due to the leaking magnetic flux to possibly cause adverse effects, such as the heat emission from the main body of the secondary battery.

Since the battery pack disclosed in PTL 2 has a structure in which the flat-shaped coil is sandwiched between the radio wave absorbing layer and the laminating layer, it is possible to inhibit leakage of the magnetic flux from the face of the flat-shaped coil being in contact with the radio wave absorbing layer but it is not possible to inhibit the leakage of the magnetic flux from faces of the flat-shaped coil perpendicular to the radio wave absorbing layer. Accordingly, there is a problem in that the eddy current occurs on a casing of the secondary battery due to the leaking magnetic flux to possibly cause adverse effects, such as the heat emission from the main body of the secondary battery.

In order to resolve the above problems, it is an object of the present invention to provide a battery pack including a flat-shaped coil for contactless power transfer capable of inhibiting the leakage of the magnetic flux from faces other than the face to be subjected to electromagnetic coupling to reduce adverse effects, such as the heat emission of the main body of the secondary battery.

In order achieve the above object, a battery pack according to a first invention includes a secondary battery; a resin structure including the secondary battery; and a flat-shaped coil for contactless power transfer embedded at one face side of the resin structure. The resin structure contains a magnetic material at least at the one face side thereof.

In a battery pack according to a second invention, part of the flat-shaped coil is externally exposed at the one face side of the resin structure in the first invention.

In a battery pack according a third invention, the resin structure contains the magnetic material only at the one face side thereof in the first or second invention.

In a battery pack according to a fourth invention, the resin structure has a thermal conductivity higher than that at the one face side at the other face side opposite to the one face side in any of the first to third inventions.

In a battery pack according to a fifth invention, the resin structure includes a terminal board including a plurality of external terminals connectable to an external device and the terminal board includes the external terminals connected to electrodes of the secondary battery and the external terminals connected to ends of the flat-shaped coil in any of the first to fourth inventions.

In a battery pack according to a sixth invention, each end of the flat-shaped coil is connected to an external terminal connectable to an external device, provided at the one face side of the resin structure in any of the first to fourth inventions.

In a battery pack according to a seventh invention, the resin structure includes a circuit module for charging power transferred through the flat-shaped coil in the secondary battery in any of the first to fourth inventions.

A battery pack according to an eighth invention is housed in a battery pack container in an external device and is mounted so that the one face side of the resin structure is in contact with a cover of the battery pack container in any of the first to seventh inventions.

In the first invention, since the flat-shaped coil for contactless power transfer is embedded at one face side of the resin structure including the secondary battery and the resin structure contains a magnetic material at least at the one face side thereof, a magnetic flux is inhibited from leaking from faces other than the face to be subjected to electromagnetic coupling. Accordingly, it is possible to reduce adverse effects, such as heat emission from the main body of the secondary battery due to an eddy current occurring on a casing of the secondary battery. In addition, the leakage of the magnetic flux from the faces other than the face to be subjected to the electromagnetic coupling can be inhibited to reduce the loss of the electromagnetic coupling.

In the second invention, since part of the flat-shaped coil is externally exposed at the one face side of the resin structure, the face where part of the flat-shaped coil is externally exposed can be subjected to the electromagnetic coupling to reduce the loss of the electromagnetic coupling.

In the third invention, since the resin structure contains the magnetic material only at the one face side thereof, the material cost of the resin structure is reduced.

In the fourth invention, since the resin structure has a thermal conductivity higher than that at the one face side at the other face side opposite to the one face side, it is possible to radiate the heat emitted from the secondary battery from the other face side of the resin structure.

In the fifth invention, the resin structure includes the terminal board including the plurality of external terminals connectable to an external device and the terminal board includes the external terminals connected to the electrodes of the secondary battery and the external terminals connected to the ends of the flat-shaped coil. Accordingly, the external terminals connected to the ends of the flat-shaped coil can be provided near the external terminals connected to the electrodes of the secondary battery. Consequently, it is possible to realize an external device capable of the contactless power transfer without largely changing the structure of electrodes of the external device electrically connected to the external terminals.

In the sixth invention, since each end of the flat-shaped coil is connected to the external terminal connectable to an external device, provided at the one face side of the resin structure, it is possible to decrease the wiring distance for the connection between the end of the flat-shaped coil and the external terminal.

In the seventh invention, since the resin structure includes the circuit module for charging power transferred through the flat-shaped coil in the secondary battery, it is possible to charge the power transferred from a coil at a non-contact charger side in the secondary battery not through an external circuit or the like.

In the eighth invention, since the battery pack is housed in a battery pack container in an external device and the battery pack is mounted so that the one face side of the resin structure is in contact with a cover of the battery pack container, only the cover exists between the coil at the non-contact charger side and the flat-shaped coil in the contactless power transfer. Accordingly, it is possible to reduce the loss of the electromagnetic coupling.

With the battery pack according to the present invention, since the flat-shaped coil for contactless power transfer is embedded at one face side of the resin structure including the secondary battery and the resin structure contains a magnetic material at least at the one face side thereof, the magnetic flux is inhibited from leaking from the faces other than the face to be subjected to electromagnetic coupling. Accordingly, it is possible to reduce adverse effects, such as heat emission from the main body of the secondary battery due to an eddy current occurring on the casing of the secondary battery. In addition, the leakage of the magnetic flux from the faces other than the face to be subjected to the electromagnetic coupling can be inhibited to reduce the loss of the electromagnetic coupling.

DETAILED DESCRIPTION OF THE INVENTION

Battery packs according to embodiments of the present invention will herein be described specifically with reference to the attached drawings. The embodiments described below do not limit the inventions described in the claims and all the combinations of features described in the embodiments are not necessarily essential to means for solving the problems.

(First Embodiment)

Figure 1:
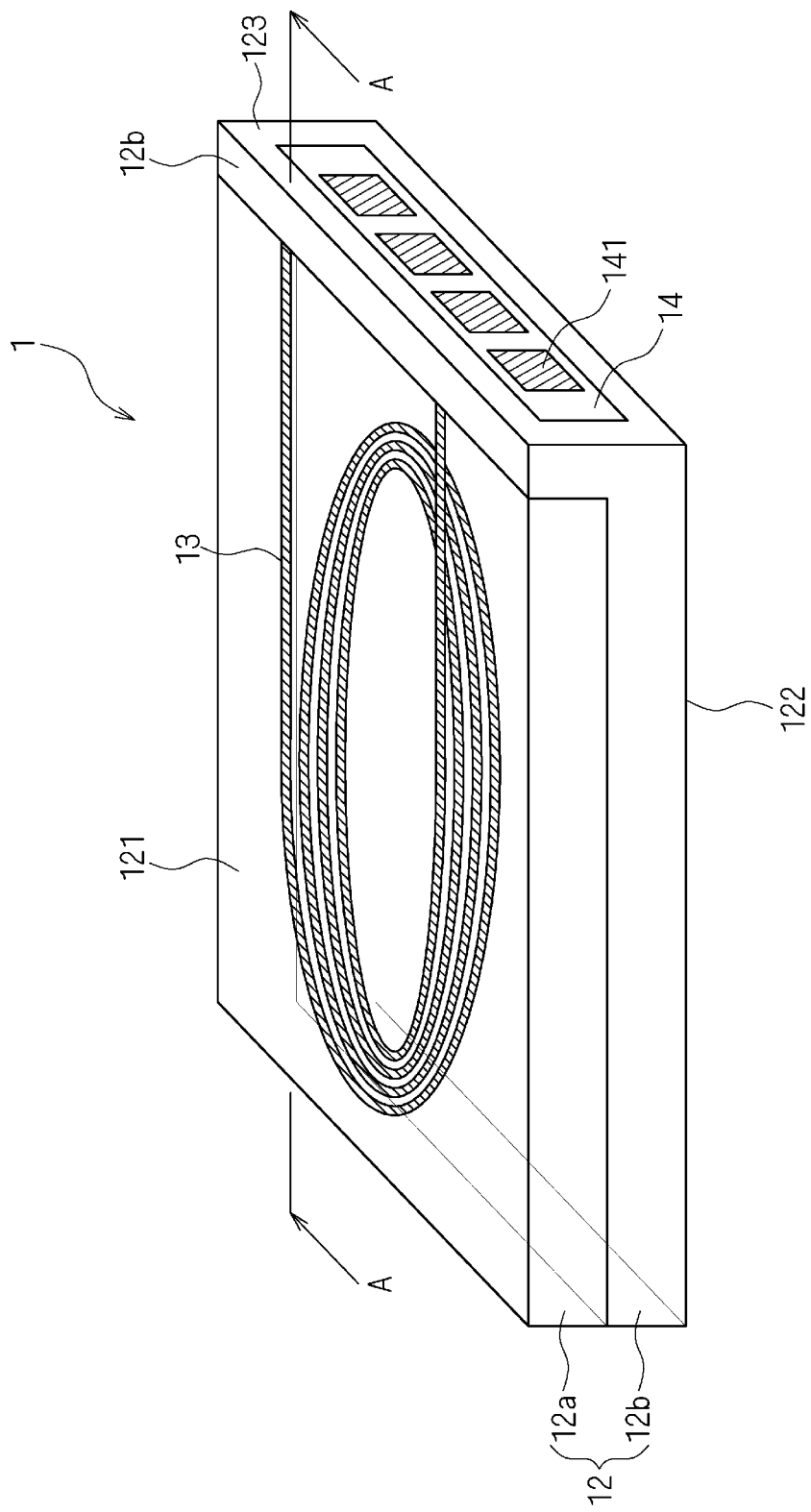
FIG. 1 is a perspective view of a battery pack according to a first embodiment of the present invention.
Figure 2:
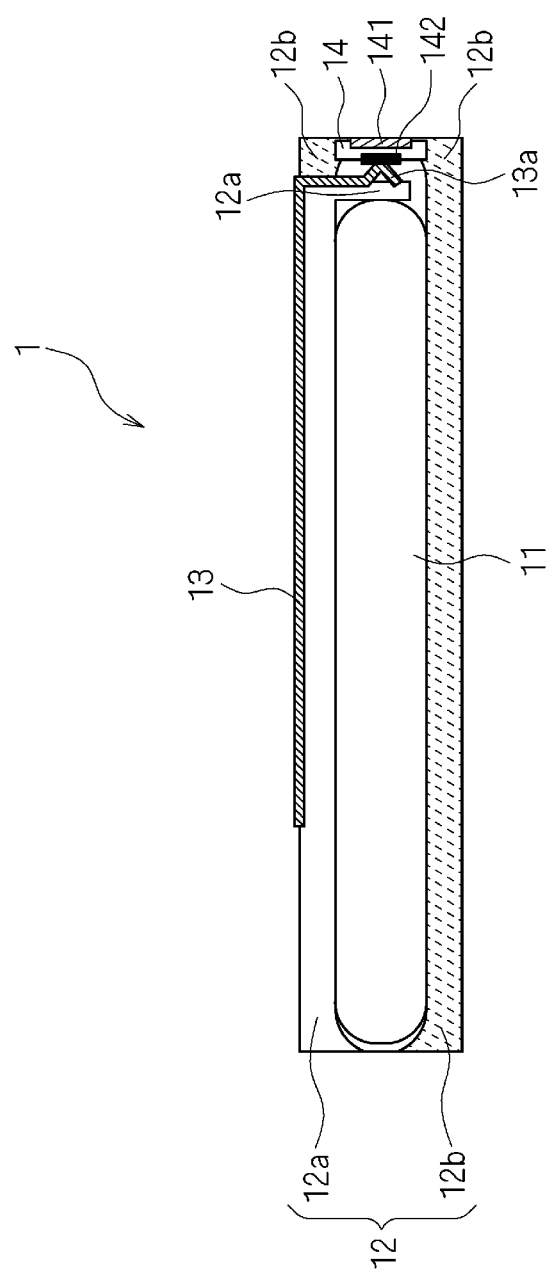
FIG. 2 is a cross-sectional view taken along a line A-A of the battery pack shown in FIG. 1.

FIG. 1 is a perspective view of a battery pack according to a first embodiment of the present invention. FIG. 2 is a cross-sectional view taken along a line A-A of the battery pack shown in FIG. 1. As shown in FIGS. 1 and 2, a battery pack 1 according to the first embodiment of the present invention includes a secondary battery 11, a resin structure 12 including the secondary battery 11, and a flat-shaped coil 13 for contactless power transfer embedded at one face side of the resin structure 12. The resin structure 12 includes a terminal board 14 including multiple external terminals 141 connectable to an external device.

The secondary battery 11 is capable of accumulating electricity by charging and is, for example, a Nickel metal hydride (Ni-MH) battery or a lithium-ion battery (Li-ion) battery. The secondary battery 11 is not limited to a flat shape and may have another shape.

The resin structure 12 is composed of a first member 12a and a second member 12b. The first member 12a is fitted into the second member 12b to include the secondary battery 11 in the resin structure 12. The material of the first member 12a and the second member 12b is a hardening resin that is produced by reducing a magnetic material, such as ferrite, into fine particles and kneading. The resin structure 12 has a flat plate shape and has two opposing flat faces (a first flat face 121 and a second flat face 122) and four side faces perpendicular to the flat faces.

The flat-shaped coil 13 is formed of a conductor, such as a copper wire, having a spiral shape. Although the flat-shaped coil 13 has a substantially circular external shape, the flat-shaped coil 13 may have a substantially elliptical external shape or a substantially quadrangular external shape. The flat-shaped coil 13 is embedded at the first flat face 121 side of the resin structure 12. The flat-shaped coil 13 may be molded integrally with the first member 12a of the resin structure 12 or may be embedded at the first flat face 121 side of the resin structure 12 after the molding. The first flat face 121 in which the flat-shaped coil 13 is embedded is electromagnetically coupled to a coil (not shown) at a non-contact charger side in the contactless power transfer.

Since the flat-shaped coil 13 is embedded at the first flat face 121 side of the resin structure 12 and the faces perpendicular to the face (the first flat face 121) to be subjected to electromagnetic coupling are covered with the hardening resin containing the magnetic material, it is possible to inhibit the magnetic flux from leaking from the faces other than the face to be subjected to the electromagnetic coupling. In the resin structure 12, the leakage of the magnetic flux from the faces other than the face to be subjected to the electromagnetic coupling can be inhibited to reduce adverse effects, such as the heat emission from the main body of the secondary battery 11, thereby reducing the loss of the electromagnetic coupling. In addition, since the flat-shaped coil 13 is embedded in the resin structure 12 such that part of the flat-shaped coil 13 is externally exposed at the first flat face 121 side, the first flat face 121 is to be subjected to the electromagnetic coupling to reduce the loss of the electromagnetic coupling.

Part of the terminal board 14 is included in the second member 12b of the resin structure 12. The terminal board 14 is provided in one side face 123 of the resin structure 12 and includes the multiple external terminals 141 connectable to an external device. The external terminals 141 include the external terminals connected to electrodes (not shown) of the secondary battery 11 and the external terminals connected to ends of the flat-shaped coil 13. The electrodes of the secondary battery 11 are electrically connected to the external terminals 141 by using wiring, a flexible printed circuit board, and so on, as in the battery packs in related art.

In contrast, each end of the flat-shaped coil 13 is electrically connected to the external terminals 141 by bringing a protrusion 13a provided at the end of the flat-shaped coil 13 into contact with an electrode 142 provided on the terminal board 14. The protrusion 13a is formed by mountain-folding the end of the flat-shaped coil 13, which is bent so as to be parallel to the terminal board 14 along the shape of the first member 12a of the resin structure 12, and part of the protrusion 13a is arranged so as to be in contact with the electrode 142. The electrode 142 is provided on a face opposite to the face of the terminal board 14 where the external terminal 141 is provided and is electrically connected to the external terminal 141 via a via plug (not shown), etc. provided in the terminal board 14. Since the battery pack 1 is configured so that the protrusion 13a is in contact with the electrode 142 and the end of the flat-shaped coil 13 is electrically connected to the external terminal 141 only by fitting the first member 12a of the resin structure 12 into the second member 12b thereof, the secondary battery 11 can be easily replaced with another one.

As described above, in the battery pack 1 according to the first embodiment of the present invention, since the flat-shaped coil 13 is embedded at one face side of the resin structure 12 where the secondary battery 11 is included and the resin structure 12 is made of the hardening resin containing the magnetic material, it is possible to inhibit the magnetic flux occurring in the flat-shaped coil 13 from leaking from the faces other than the face to be subjected to the electromagnetic coupling to reduce adverse effects, such as the heat emission from the main body of the secondary battery 11, thereby reducing the loss of the electromagnetic coupling. Since the substantially entire face of the secondary battery 11 is covered with the hardening resin containing the magnetic material in the resin structure 12, the secondary battery 11 is hardly affected by the magnetic flux occurring in the flat-shaped coil 13 and/or the coil (not shown) at the non-contact charger side.

Figure 3:
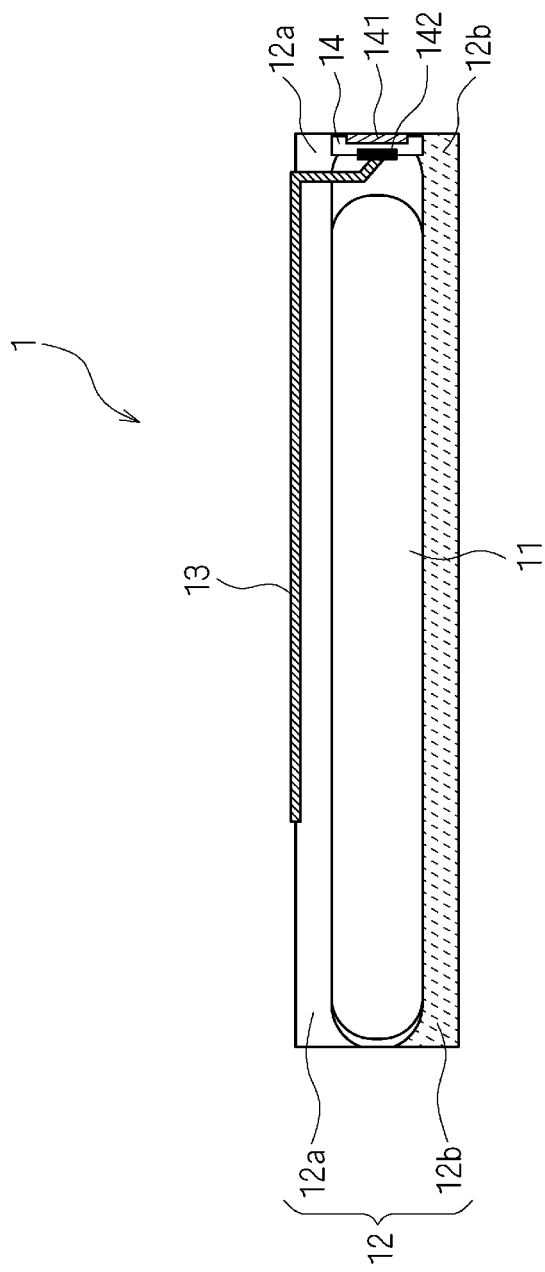
FIG. 3 is a cross-sectional view taken along a face corresponding to the A-A cross section when an end of a flat-shaped coil is connected to an external terminal in a different manner in the battery pack shown in FIG. 1.

The connection between the end of the flat-shaped coil 13 and the external terminal 141 is not limited to the structure shown in FIG. 2. FIG. 3 is a cross-sectional view taken along a face corresponding to the A-A cross section when the end of the flat-shaped coil 13 is connected to the external terminal 141 in a different manner in the battery pack 1 shown in FIG. 1. As shown in FIG. 3, the battery pack 1 may have a structure in which the end of the flat-shaped coil 13 is directly connected to the electrode 142 provided on the terminal board 14 with solder or the like. However, in the structure in which the end of the flat-shaped coil 13 is directly connected to the electrode 142 provided on the terminal board 14, the terminal board 14 is provided on the one side face 123 of the resin structure 12 such that part of the terminal board 14 is included in the first member 12a of the resin structure 12.

The resin structure 12 is not limited to the structure in which the first member 12a is fitted into the second member 12b to include the secondary battery 11. The resin structure 12 may have a structure in which the resin structure 12 is molded integrally with the secondary battery 11 that is included in the resin structure 12.

(Second Embodiment)

Figure 4:
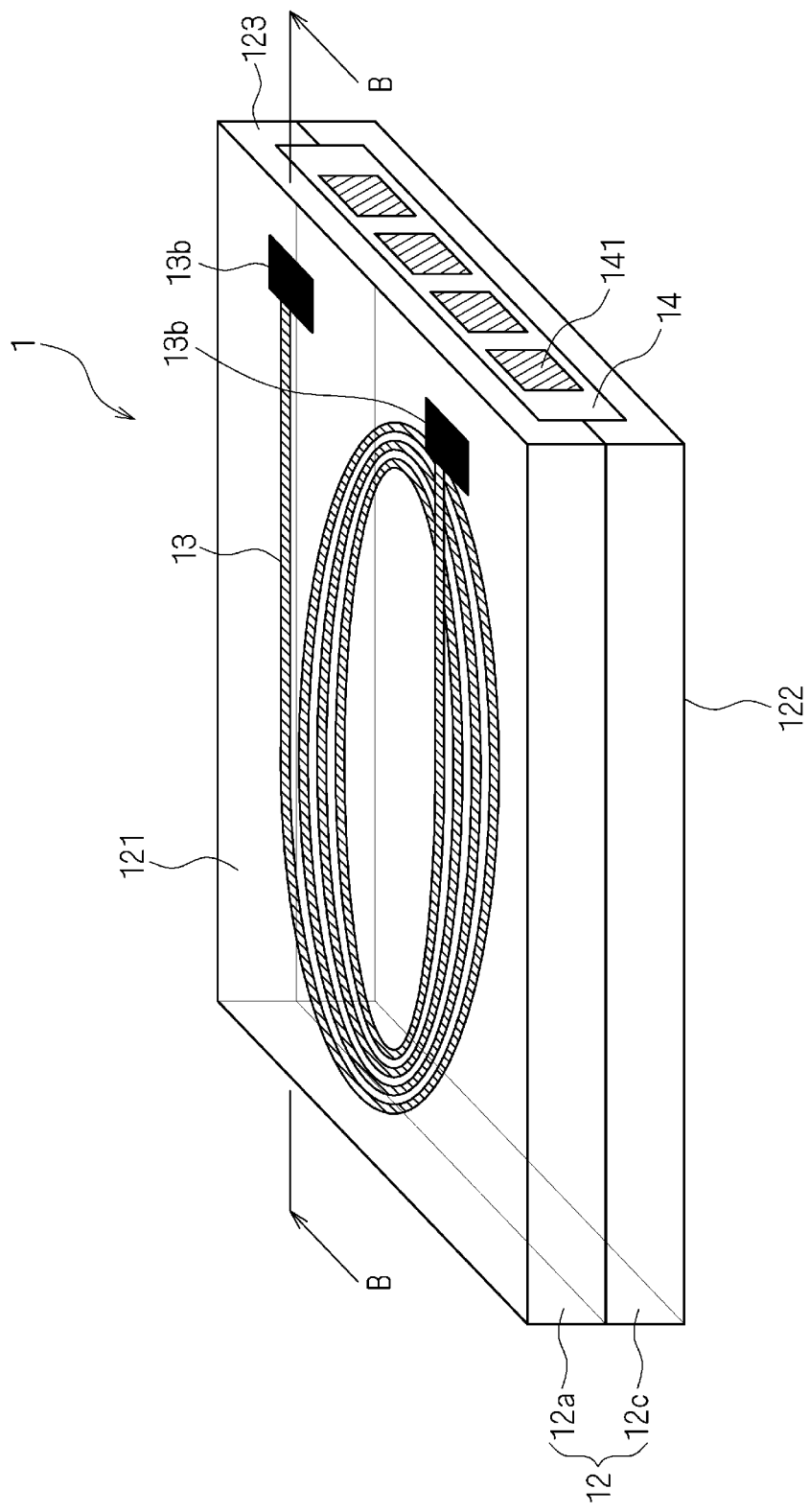
FIG. 4 is a perspective view of a battery pack according to a second embodiment of the present invention.
Figure 5:
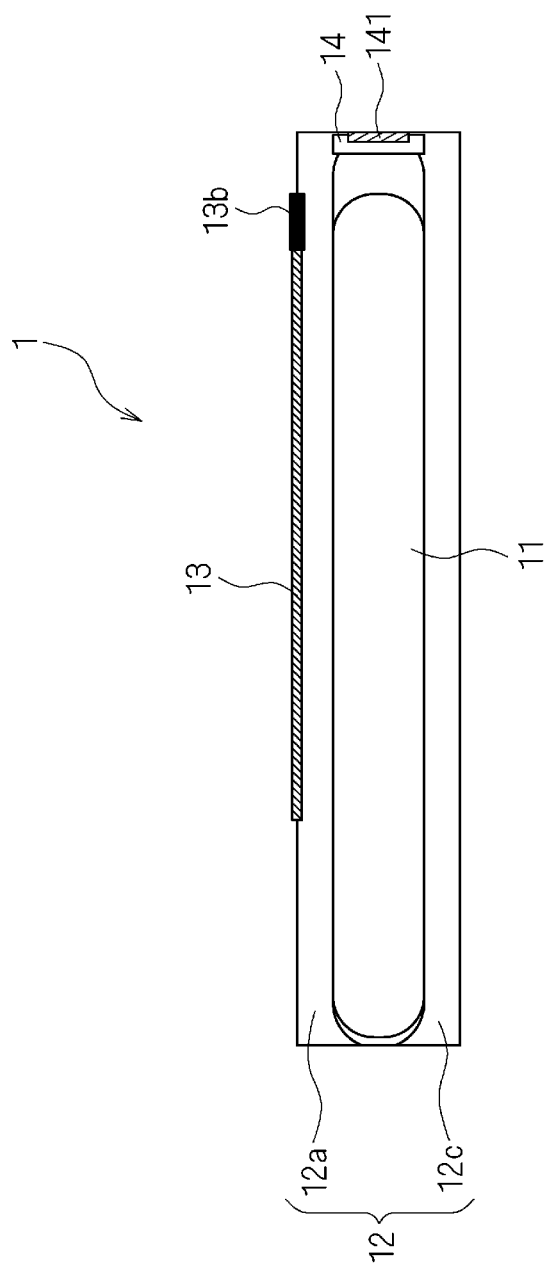
FIG. 5 is a cross-sectional view taken along a line B-B of the battery pack shown in FIG. 4.

FIG. 4 is a perspective view of a battery pack according to a second embodiment of the present invention. FIG. 5 is a cross-sectional view taken along a line B-B of the battery pack shown in FIG. 4. As shown in FIGS. 4 and 5, the battery pack 1 according to the second embodiment of the present invention includes the secondary battery 11, the resin structure 12 including the secondary battery 11, and the flat-shaped coil 13 for contactless power transfer embedded at one face side of the resin structure 12. The resin structure 12 includes external terminals 13b provided on the first flat face 121 and the terminal board 14 including the multiple external terminals 141 connectable to an external device. The same reference numerals are used in the battery pack 1 shown in FIGS. 4 and 5 to identify the same components in the battery pack 1 of the first embodiment shown in FIGS. 1 and 2. A detailed description of such components is omitted herein.

The resin structure 12 is composed of the first member 12a and a third member 12c. The first member 12a is fitted into the third member 12c to include the secondary battery 11 in the resin structure 12. The material of the first member 12a is a hardening resin that is produced by reducing a magnetic material, such as ferrite, into fine particles and kneading, as in the first embodiment. The material of the third member 12c is a hardening resin that contains no fine particle of the magnetic material or a hardening resin containing the fine particles of the magnetic material of an amount smaller than that of the first member 12a. Using the hardening resin that contains no fine particle of the magnetic material or the like as the material of the third member 12c allows the material cost of the resin structure 12 to be reduced. In addition, using the hardening resin that contains no fine particle of the magnetic material or the like as the material of the third member 12c increases the number of material choices. Accordingly, a material having a thermal conductivity higher than that of the material of the first member 12a can be selected as the material of the third member 12c. Selecting a material having a higher thermal conductivity as the material of the third member 12c allows the heat emitted from the secondary battery 11 to be radiated from the third member 12c. In order to further increase the heat radiation from the third member 12c, the third member 12c may be molded into a fin shape or the like to increase the surface area of the second flat face 122.

The electrodes (not shown) of the secondary battery 11 are connected to the external terminals 141 by using wiring, a flexible printed circuit board, and so on, as in the first embodiment. However, unlike the first embodiment, the ends of the flat-shaped coil 13 are not connected to the external terminals 141 and each end of the flat-shaped coil 13 is connected to the external terminal 13b provided on the first flat face 121 of the resin structure 12. Accordingly, it is possible to decrease the wiring distance for the connection between the end of the flat-shaped coil 13 and the external terminal 13b. In addition, when the battery pack 1 is housed in a battery pack container (not shown) in an external device and is mounted such that the first flat face 121 side of the resin structure 12 is in contact with a cover (not shown) of the battery pack container, the provision of the external terminals 13b on the first flat face 121 of the resin structure 12 allows electrical connection to an electrode (not shown) provided on the cover. Since the battery pack 1 is mounted such that the first flat face 121 side of the resin structure 12 is in contact with the cover of the battery pack container, only the cover exists between the coil at the non-contact charger side and the flat-shaped coil 13 in the contactless power transfer. Consequently, it is possible to reduce the loss of the electromagnetic coupling.

As described above, in the battery pack 1 according to the second embodiment of the present invention, since the material of the third member 12c of the resin structure 12 at the second flat face 122 side, which is opposite to the first flat face 121 side of the resin structure 12, is a hardening resin that contains no fine particle of the magnetic material or a hardening resin containing the fine particles of the magnetic material of an amount smaller than that of the first member 12a, it is possible to reduce the material cost of the resin structure 12. In addition, since the third member 12c of the resin structure 12 has a thermal conductivity higher than that of the first member 12a, it is possible to radiate the heat emitted from the secondary battery 11 from the third member 12c.

(Third Embodiment)

Figure 6:
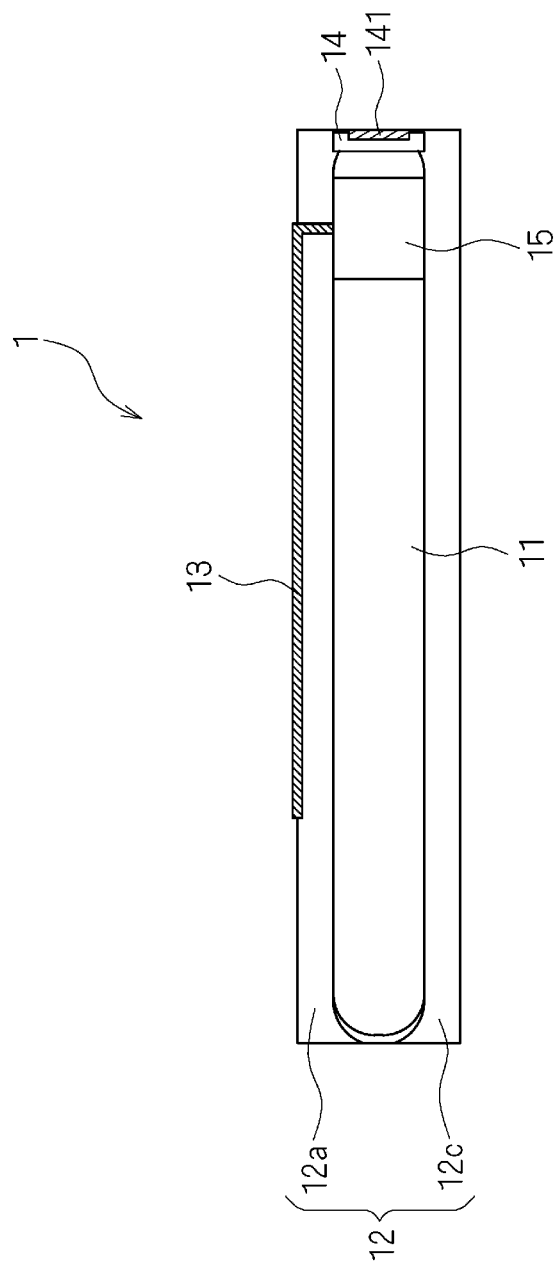
FIG. 6 is a cross-sectional view taken along a face corresponding to the B-B cross section of the battery pack shown in FIG. 4 of a battery pack according to a third embodiment of the present invention.

FIG. 6 is a cross-sectional view taken along a face corresponding to the B-B cross section of the battery pack shown in FIG. 4 of a battery pack according to a third embodiment of the present invention. As shown in FIG. 6, the battery pack 1 according to the third embodiment of the present invention includes the secondary battery 11, the resin structure 12 including the secondary battery 11, and the flat-shaped coil 13 for contactless power transfer embedded at one face side of the resin structure 12. The resin structure 12 includes the terminal board 14 including the multiple external terminals 141 connectable to an external device. In addition, the battery pack 1 includes a circuit module 15 for charging power transferred from a coil (not shown) at a non-contact charger side through the flat-shaped coil 13 in the secondary battery 11. The same reference numerals are used in the battery pack 1 shown in FIG. 6 to identify the same components in the battery pack 1 of the second embodiment shown in FIG. 5. A detailed description of such components is omitted herein.

The circuit module 15 at least includes a rectifier circuit, a regulator circuit, and a charge control circuit. The circuit module 15 is connected to the ends of the flat-shaped coil 13 and is also connected to electrodes of the secondary battery 11 (not shown). Accordingly, the battery pack 1 is capable of charging the power transferred from the coil at the non-contact charger side in the secondary battery 11 not thorough an external circuit, etc. and only placing and holding the battery pack 1 on the non-contact charger enables the contactless power transfer. In addition, only installing the battery pack 1 enables the contactless power transfer even in a mobile phone, etc. which does not support the contactless power transfer.

As described above, in the battery pack 1 according to the third embodiment of the present invention, since the circuit module 15 for charging the power transferred through the flat-shaped coil 13 in the secondary battery 11 is included in the resin structure 12, it is possible to charge the power transferred from the coil at the non-contact charger side in the secondary battery 11 not through an external circuit or the like.

Reference Signs List
 1 battery pack
 11 secondary battery
 12 resin structure
 13 flat-shaped coil
 14 terminal board
 15 circuit module

The invention claimed is:

1. A battery pack comprising:
  a secondary battery;
  a resin structure including the secondary battery; and
  a flat-shaped, contactless power transfer coil embedded at a first face side of the resin structure,
  wherein the resin structure contains a magnetic material at least at the first face side thereof, and
  wherein the resin structure comprises a plurality of faces that are perpendicular to the first face side of the resin structure and the plurality of side faces of the resin structure contain the magnetic material.

2. The battery pack according to claim 1,
  wherein a part of the flat-shaped, contactless power transfer coil is not embedded by the resin structure at the first face side.

3. The battery pack according to claim 1,
  wherein the resin structure contains the magnetic material only at the first face side thereof.

4. The battery pack according to claim 1,
  wherein a second face side of the resin structure opposite the first face side has a thermal conductivity higher than that at the first face side.

5. The battery pack according to claim 1,
  wherein the resin structure includes a terminal board including a plurality of external terminals connectable to an external device.

6. The battery pack according to claim 5,
  wherein at least a first external terminal of the plurality of external terminals is connected to electrodes of the secondary battery and the external terminals connected to ends of the flat-shaped, contactless power transfer coil.

7. The battery pack according to claim 5,
  wherein at least a first external terminal of the plurality of external terminals is connected to an end of the flat-shaped, contactless power transfer coil.

8. The battery pack according to claim 5, wherein the resin structure includes a first member and a second member, and the secondary battery is disposed between the first member and the second member.

9. The battery pack according to claim 1,
  wherein each end of the flat-shaped, contactless power transfer coil is connected to a respective external terminal provided at the first face side of the resin structure.

10. The battery pack according to claim 1,
  wherein the resin structure includes a circuit module configured to transfer charging power through the flat-shaped, contactless power transfer coil in the secondary battery.

11. The battery pack according to claim 1,
  wherein the battery pack is configured to be housed in a battery pack container in an external device, and
  wherein the battery pack is configured to be mounted so that the first face side of the resin structure is in contact with a cover of the battery pack container.

12. The battery pack according to claim 1, wherein the resin structure includes a first member and a second member.

13. The battery pack according to claim 12, wherein the first member and the second member contain the magnetic material.

14. The battery pack according to claim 12, wherein the first member contains the magnetic material and the second member does not contain the magnetic material.

15. The battery pack according to claim 12, wherein an amount of the magnetic material in the second member is smaller than an amount of the magnetic material in the first member.

\* \* \* \* \*